L. LUSTIG.
TUBE CLAMP.
APPLICATION FILED JAN. 4, 1916.
1,281,800.
Patented Oct. 15, 1918.
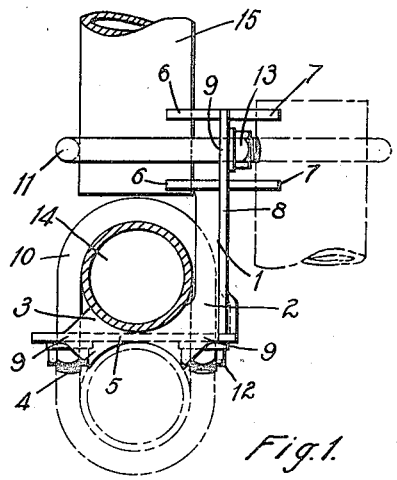
Fig. 1.
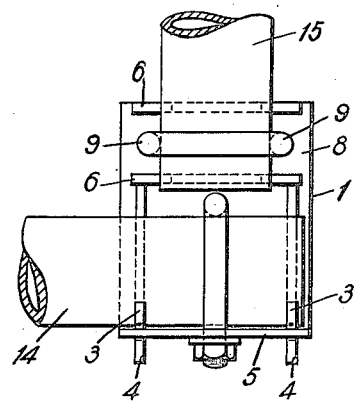
Fig. 2.
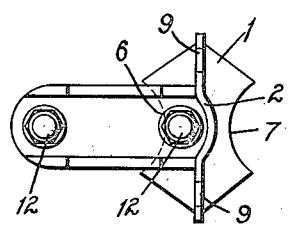
Fig. 3.
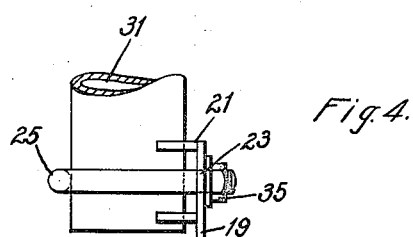
Fig. 4.
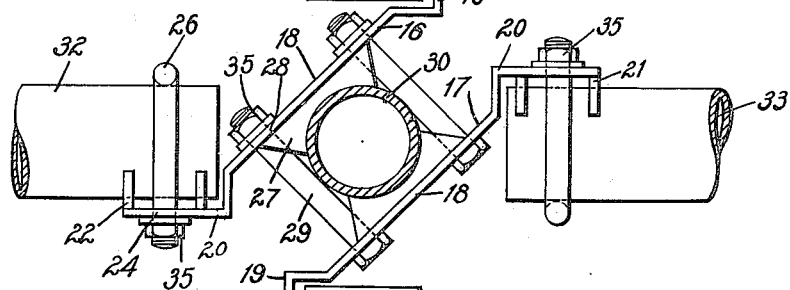
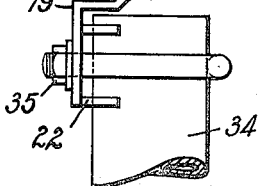
WITNESSES:
A. J. Fitzgerald.
J. H. Procter.
INVENTOR
Leo Lustig.
BY
Wesley G. Carr
ATTORNEY

UNITED STATES PATENT OFFICE.

LEO LUSTIG, OF WILKINSBURG, PENNSYLVANIA, ASSIGNOR TO WESTINGHOUSE ELECTRIC AND MANUFACTURING COMPANY, A CORPORATION OF PENNSYLVANIA.

TUBE-CLAMP.

1,281,800.  Specification of Letters Patent.  Patented Oct. 15, 1918.

Application filed January 4, 1916. Serial No. 70,263.

*To all whom it may concern:*

Be it known that I, LEO LUSTIG, a citizen of the United States, and a resident of Wilkinsburg, in the county of Allegheny and State of Pennsylvania, have invented a new and useful Improvement in Tube-Clamps, of which the following is a specification.

My invention relates to tube clamps and particularly to clamps for use in switchboards constructed of tubing.

The object of my invention is to provide a clamp of the above indicated character that may be utilized for clamping tubes in a plurality of positions with respect to each other.

In practicing my invention I provide a clamp of substantially L-shape having positioning channels on both faces of each of its legs. With my device, the respective planes of the tubes that are secured to one leg and pass through the axes of the tubes in the same general direction as the bearing surfaces of the channels are angularly disposed with respect to the similar planes of the tubes which are secured to the other leg. In order to secure the tubes in engagement with the positioning channels, I provide clamping devices of substantially U-shape that are adapted to extend through openings in the respective legs.

In the accompanying drawing, Figure 1 is a side elevational view of a tube clamp embodying my invention, Fig. 2 is a front elevational view of the tube clamp shown in Fig. 1, Fig. 3 is a bottom plan view of the tube clamp shown in Figs. 1 and 2, and Fig. 4 is a view of a modified form of the tube clamp embodying my invention.

In Figs. 1, 2 and 3, a tube clamp 1 comprises a body member 2 of substantially L-shape having projections or positioning channel members 3 and 4 on the respective faces of one of its legs 5 and projections or positioning channel members 6 and 7 on the respective faces of its other leg 8. Two openings 9 are provided in each of the legs to receive clamping members 10 and 11 of substantially U-shape. The U-shaped clamping members 10 and 11 are screw threaded at their outer ends to receive nuts 12 and 13, respectively, that are adapted to be seated against the respective legs 5 and 8 to clamp the tubes in position.

Tubes 14 and 15 may be clamped in engagement with the projections or channel members 3, 4, 6 and 7, in accordance with the positions desired, and the legs 5 and 8 may be disposed in any angular position with respect to each other. That is, the tubes may be secured in the positions shown in the broken lines in Fig. 1 by inserting the clamping members 10 and 11 in the openings 9, as illustrated.

In Fig. 4 of the drawing, two tube clamps 16 and 17 severally comprise a main body member 18 having two angularly disposed legs 19 and 20. The legs 19 and 20 are provided with channel positioning members or projections 21 and 22 and openings 23 and 24, respectively, and the latter are adapted to receive clamping members 25 and 26, respectively, of substantially U-shape. The main body member 18 is provided with projections or channel positioning members 27 and openings 28 for receiving bolts 29. The channel members 27 are adapted to position a tube 30, the members 21 and 22 of the clamp 16 are adapted to position tubes 31 and 32, respectively, and the channel members 21 and 22 of the clamp 17 are adapted to position tubes 33 and 34, respectively. The U-shaped members 25 and 26 and the bolts 29 are screw threaded at their ends to receive nuts 35 that are adapted to be seated against the body portions to clamp the respective tubes in position.

I do not limit my invention to the illustrated forms of tube clamps, as many modifications may be made within the spirit and scope of the invention as set forth in the appended claims.

I claim as my invention:

1. A tube clamp comprising a member of substantially L-shape having projections on both faces of each of its legs for positioning the tubes on both sides thereof, and means for clamping the tubes in position, the planes of the bearing surface of the projections on one leg being substantially perpendicular to the planes of the bearing surface of the projections on the other leg.

2. A tube clamp comprising a main body member having two angularly disposed legs provided with projections on both of their faces for positioning the tubes and means for clamping the tubes in position.

3. A tube clamp comprising a main body member having two angularly disposed legs provided with projections on both of their faces for positioning the tubes and members of substantially U-shape adapted to clamp the tubes in position.

4. A tube clamp comprising a body member having two legs angularly disposed with respect to each other, and means for securing the tubes in position, said legs having projections with openings therein on each of its faces for positioning the tubes.

5. A clamp comprising a body member of substantially L-shape having openings and concave positioning means on both faces of each of its legs, the planes extending through the bearing surface of the said concave positioning means on one leg being angularly disposed with respect to the planes extending through the bearing surface of the concrete positioning means on the other leg.

6. A clamping device comprising a member of substantially L-shape having channels on both faces of each of its legs, the planes extending through the bearing surface of the channels on one leg being in a different plane than the planes extending through the bearing surface of the channels on the other leg.

7. A tube-clamping device comprising a member of substantially L-shape having a channel on each face of each of its legs, the planes passing through the bearing surfaces of the channels on the respective legs being in different planes with respect to each other.

In testimony whereof, I have hereunto subscribed my name this 28th day of Dec., 1915.

LEO LUSTIG.